US012433650B2

(12) United States Patent
Nadim et al.

(10) Patent No.: US 12,433,650 B2
(45) Date of Patent: Oct. 7, 2025

(54) SELF-CONTOURING PLATE SYSTEM FOR BONE FRACTURES WITH ANTI-ROTATION STOP (71) Applicant: Orthopedic Designs North America, Inc., Tampa, FL (US)

(72) Inventors: Yasser Nadim, Somerset, KY (US); Lance Fagan, Tampa, FL (US)

( * ) Notice: Subject to any disclaimer, the term of this patent is extended or adjusted under 35 U.S.C. 154(b) by 256 days.

(21) Appl. No.: 18/347,134

(22) Filed: Jul. 5, 2023

(65) Prior Publication Data
US 2023/0346439 A1 Nov. 2, 2023

Related U.S. Application Data (63) Continuation-in-part of application No. 17/805,492, filed on Jun. 6, 2022, now Pat. No. 12,133,667, which is a continuation-in-part of application No. 17/508,813, filed on Oct. 22, 2021, now abandoned.

(51) Int. Cl.
*A61B 17/80* (2006.01)
(52) U.S. Cl.
CPC ...... *A61B 17/8061* (2013.01); *A61B 17/8014* (2013.01); *A61B 17/8023* (2013.01); *A61B 17/8057* (2013.01); *A61B 17/8085* (2013.01)
(58) Field of Classification Search
CPC . A61B 17/80; A61B 17/8023; A61B 17/8061; A61B 17/8066; A61B 17/8085
See application file for complete search history.

(56) References Cited

U.S. PATENT DOCUMENTS

| 6,060,641 | A | * | 5/2000 | Manolidis | A61F 2/2803 128/898 |
| 7,862,586 | B2 | * | 1/2011 | Malek | A61B 17/7049 606/246 |
| 8,591,551 | B2 | * | 11/2013 | Miller | A61B 17/7001 606/264 |
| 8,685,022 | B2 | | 4/2014 | Lorenz et al. | |
| 8,821,552 | B2 | * | 9/2014 | Reitzig | A61B 17/7059 606/282 |
| 9,636,157 | B2 | | 5/2017 | Medoff | |
| 9,750,538 | B2 | | 9/2017 | Soffiatti et al. | |
| 10,206,713 | B2 | | 2/2019 | Olsen et al. | |
| 2013/0274803 | A1 | * | 10/2013 | Noordeen | A61B 17/7013 606/256 |
| 2020/0289271 | A1 | * | 9/2020 | Nedrud | A61F 2/2803 |

FOREIGN PATENT DOCUMENTS

CN 111588455 8/2020

* cited by examiner

*Primary Examiner* — Larry E Waggle, Jr.
(74) *Attorney, Agent, or Firm* — Distinct Patent Law; Justin P. Miller (57) ABSTRACT

The self-contouring plate system for bone fractures with anti-rotation stop allows a surgeon to bridge a bone fracture, primarily in bones of complex shape where the use of plates or screws is difficult. The self-contouring plate is formed from a series of similar or identical rigid elements, the elements able to bend and rotate with respect to each other. This flexibility is initially helpful as the surgeon contours the device to the shape of the bone. When the desired shape is reached, the elements are locked into place. The length of device is adjusted by adding or removing elements, much like a necklace. Each element of the self-contouring plate includes a ball that extends away from a body, a cavity for receiving the ball of the neighboring plate, and a screw to compress the ball within the cavity.

18 Claims, 8 Drawing Sheets

SELF-CONTOURING PLATE SYSTEM FOR BONE FRACTURES WITH ANTI-ROTATION STOP

CROSS-REFERENCE TO RELATED APPLICATIONS

This application is a continuation-in-part of U.S. patent application Ser. No. 17/805,492, filed Jun. 6, 2023, titled Self-contouring plate for bone fractures, which is in turn a continuation-in-part of U.S. patent application Ser. No. 17/508,813, filed Oct. 22, 2021, titled Self-contouring plate for bone fractures.

The related applications are incorporated into this application by reference.

FIELD

This invention relates to the field of treating bone fractures and more particularly to a device for treating a complex bone fracture.

BACKGROUND

The treatment of complex bone fractures has moved beyond the antiquated treatments of full-body casts and traction.

Instead, the use of screws and plates helps surgeons to fix fractures in position, allowing the patient to regain partial mobility while the bone mends.

But the use of mechanical fracture supports, such as plates, is complicated by bones with complex shapes, such as the pelvis.

Current methods require the surgeon to contour, or bend, a plate during surgery, the plate intended to match the contour of the patient's bone.

This contouring is difficult and imperfect and can result in fractures that are only partially reduced. And imperfect contouring can cause loss of reduction obtained prior to applying the plate. The result is increased healing time and decreased patient mobility.

What is needed is a device that is contoured to the bone, the device then locked into shape and affixed to the bone.

SUMMARY

The self-contouring plate system for bone fractures with anti-rotation stop allows a surgeon to bridge a bone fracture, primarily in bones of complex shape where the use of plates or screws is difficult.

The self-contouring plate system is formed from a series of similar or identical rigid elements, the elements able to bend and rotate with respect to each other. This flexibility is initially helpful as the surgeon contours the device to the shape of the bone. When the desired shape is reached, the elements are locked into place.

The length of device is adjusted by adding or removing elements, much like a necklace. Each element of the self-contouring plate includes a ball that extends away from a body, a cavity for receiving the ball of the neighboring plate, and one or more screws to compress the ball within the cavity.

The body of each rigid element is preferably formed from a single piece of material. The result is increased life due to a lack of joints.

Each element can rotate in three directions—swivel left and right, or yaw; tilt forward and backward, or pitch; and rotate about its centerline, or roll. This freedom of rotation is created by a ball-and-socket connection that joins each element to the next. When the desired arrangement and angles are reached, the ball-and-socket joint is fixed in position by compression of the socket. Compression of the socket is created by one or more compression screws. Restated, the ball-and-socket joint has both a locked position or condition, and an unlocked position or condition—a compressed position and an uncompressed position. In the preferred embodiment, compression of the socket is created by two screws located across from each other, or separated by 180 degrees with respect to the socket. The use of paired screws results in even compression.

The ball-and-socket connection allows for a full range of motion. The preferred embodiment has the ability to swivel in 45 degrees of yaw, tilt between 45- and 90-degrees of pitch, and rotate in 360 degrees of roll.

The head, or ball of the ball and socket joint, includes a projection or protrusion. This projection or protrusion moves within a projection cavity, or secondary recess. The interaction of the projection and the upper rotation limit and lower rotation limit of the projection cavity prevents over-rotation of the head within the socket. The rotation limits, or movement limits, of the protrusion within the projection cavity are set by the walls of the projection cavity. Motion of the projection will ultimately result in contact between the projection and the projection cavity walls.

By preventing over-rotation, the levering action or prying that could occur is prevented, therefore avoiding conditions where the head could pop out of the socket.

One or more screw holes in each element allow placement of bone screws, fixing the device to the underlying bone.

The entire device is intended for permanent internal implantation, directly against the bone. The device does not protrude through muscle or skin, and does not have elements that remain external to the body. The plates are optionally curved to match a surface profile of a curved bone.

The centerline of each element of the device is preferably consistent, with the centerline of the ball matching that of the centerline of the body. When installation is complete, there are no protruding elements that could cause discomfort by aggravating the surrounding tissues. Stated differently, in the preferred embodiment the thickness of the device is substantially consistent, without protruding elements. The ball and socket are preferably positioned at opposite ends of the body.

The self-contouring plate is strengthened by being positioned against the surface of the bone. The plates and connections are directly against the surface of the bone, avoiding rotational moments that would increase the force against the plates. This is in contrast to the prior art devices, which were placed partially outside the patient's skin, resulting in traumatic and uncomfortable pins that passed through the patient's bone and muscle. The prior art placed the points of rotation away from the bone, thus requiring a thicker mechanism to compensate for the resulting rotational forces.

The self-contouring plate includes a solid ball, without a through-hole for a fixation screw. The result is a stronger ball connection with more material, and a stronger ball that better resists deformation from compression. The ball is preferably spherical, with the only interruption to its surface being the neck that connects the ball to the body of the plate.

Additionally, by using a solid ball, the greatest range of movement is possible. Requiring placement of a fastener through the ball limits angular rotation of the ball because the hole in the ball must line up with a second hole for receipt of the fastener.

This additional range of motion is helpful in complex fractures, such as fractures of the pelvis and acetabulum.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
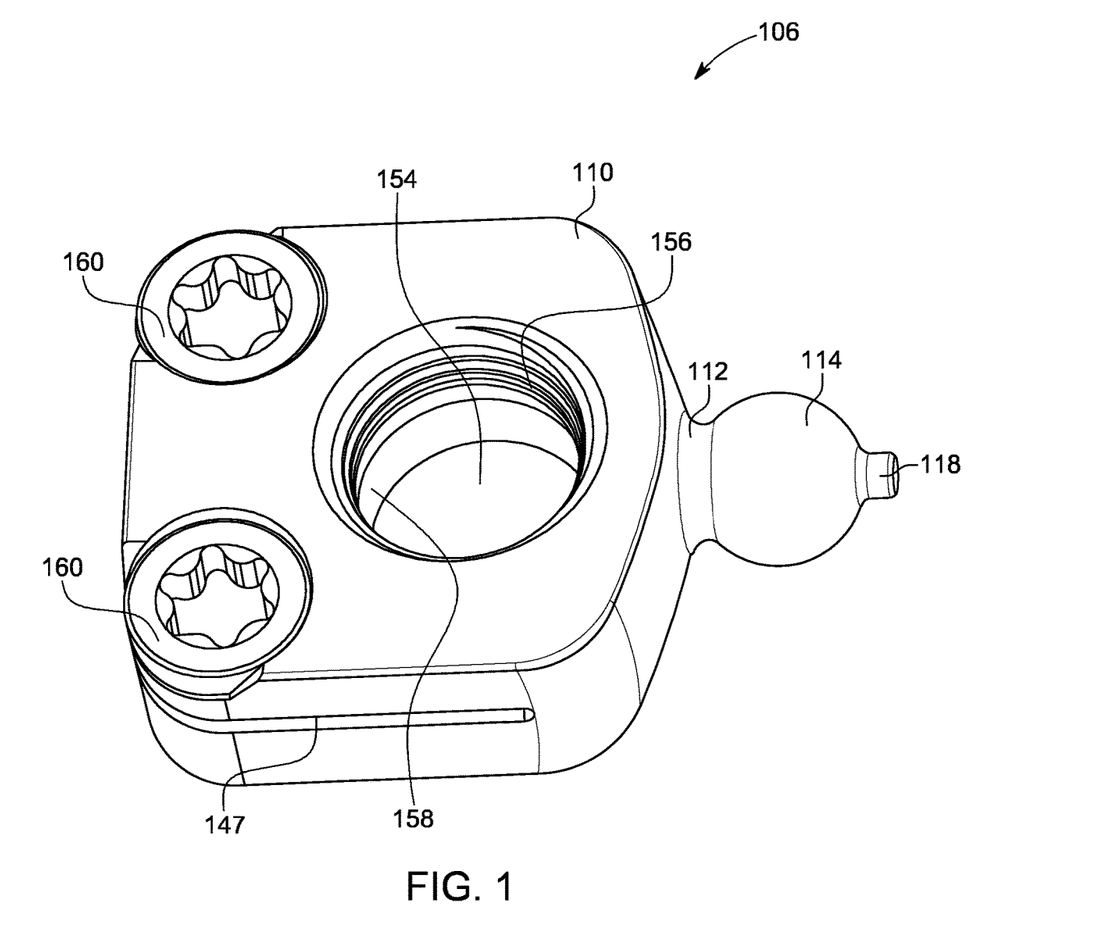
FIG. 1 illustrates a first isometric view of the self-contouring plate with anti-rotation stop.
Figure 2:
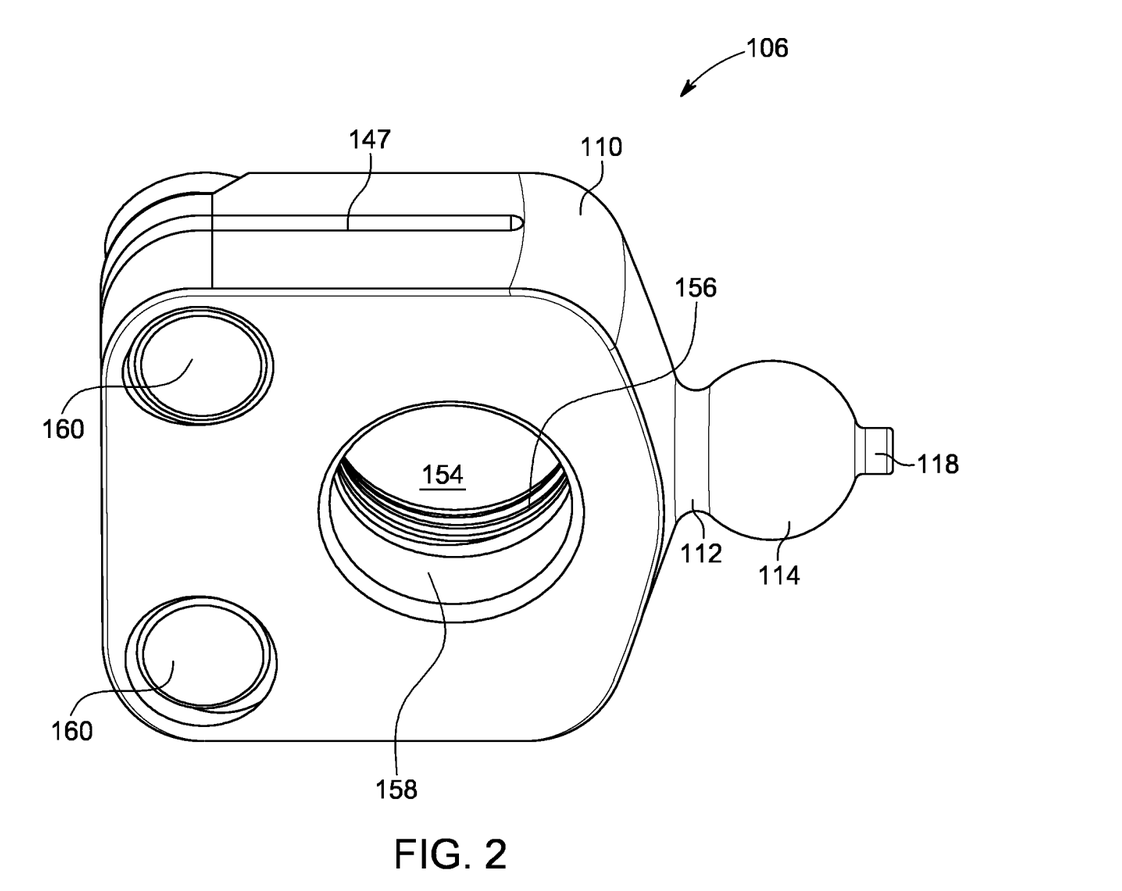
FIG. 2 illustrates a second isometric view of the self-contouring plate with anti-rotation stop.

Referring to FIGS. 1 and 2, a first isometric view and a second isometric view of the self-contouring plate with anti-rotation stop are shown.

The central plate 106 of the self-contouring plate system with rotation stop 100 (see FIGS. 5 and 6) includes a body 110, which transitions to a neck 112 with head 114 and projection 118. A body hole 154 includes a threaded section, body hole threaded upper section 156, and an unthreaded section, body hole unthreaded lower section 158.

Figure 4:
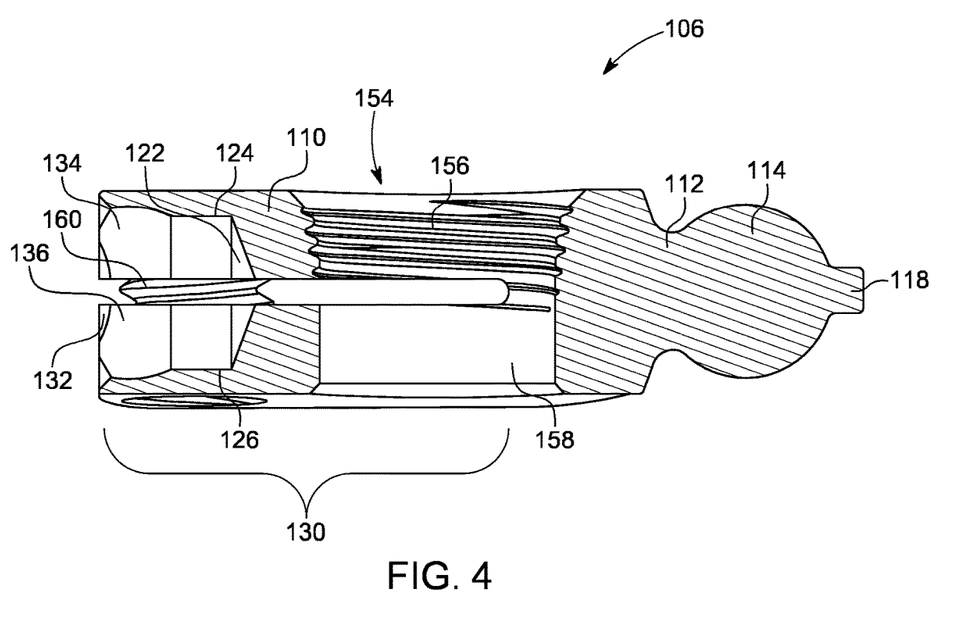
FIG. 4 illustrates a cross-sectional view of the self-contouring plate with anti-rotation stop.

Compression screws 160 compress and release the body 110 across the compression slot 147 that splits/divides the socket 132 (see FIG. 4). The rotation of the compression screws 160 changes the size of the socket 132 via compression and decompression (see FIG. 4).

Figure 3:
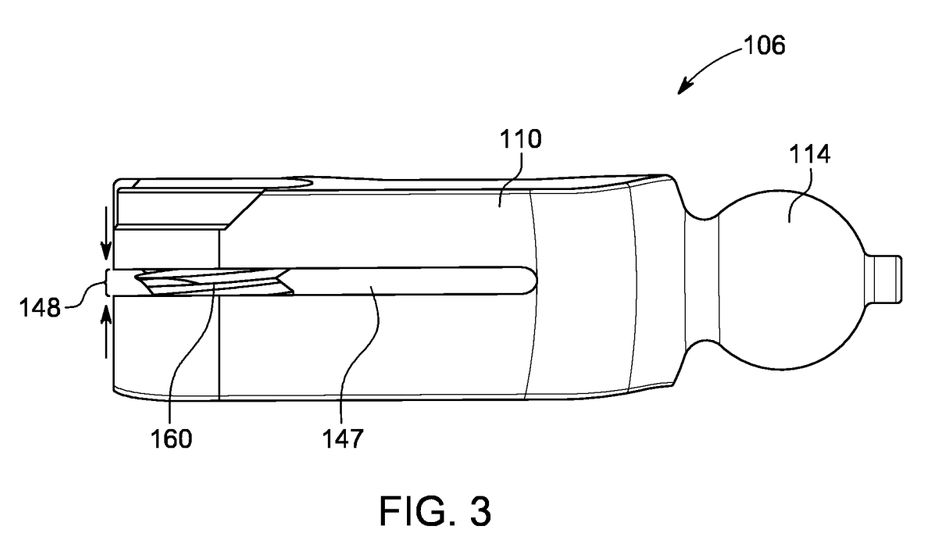
FIG. 3 illustrates a side view of the self-contouring plate with anti-rotation stop.

Referring to FIG. 3, a side view of the self-contouring plate with anti-rotation stop is shown.

Rotation of the compression screws 160 causes an increase or decrease of the size of the compression gap 148 measured across the compression slot 147. The change in size of the compression slot affects how tightly the socket 132 (see FIG. 4) bears against the head 114.

Referring to FIG. 4, a cross-sectional view of the self-contouring plate with anti-rotation stop is shown.

A typical central plate 106 is shown with neck 112, head 114, projection 118. Bone screws are passed through the body hole 154, which includes body hole threaded upper section 156 and body hole unthreaded lower section 158. The body hole unthreaded lower section 158 is purposefully left unthreaded to allow motion of that section of the body 110 caused by rotation of the compression screw 160. The section of the body 110 that includes the body hole 154 is part of the compression section 130, or the section of the body 110 that moves as the compression screws 160 are rotated. Leaving a section of the body hole 154 unthreaded allows the surgeon to adjust compression of the socket 132 after installation of the bone screw.

The socket 132 includes an upper cup 134 and a lower cup 136. Further into the socket is a projection cavity 122, including an upper rotation limit 124 and a lower rotation limit 126. As a head 114 rotates within the socket 132, the projection 118 contacts the upper rotation limit 124 or lower rotation limit 126, preventing over rotation and unintentional disconnection.

While this cross section is shown in two dimensions, the device is three-dimensional. State a differently, the projection cavity 122 has a conical shape, adjacent to the cylindrical shape of the upper rotation limit 124 and lower rotation limit 126, in turn adjacent to the spherical shape of the socket 132. It is also noted that the upper rotation limit 124 and lower rotation limit 126 are appropriate given the two-dimensional nature of the drawings, but during operation it is contact between the projection 118 and of the holes of the projection cavity 122, or perimeter walls, that sets the limit for motion of the projection 118.

Figure 5:
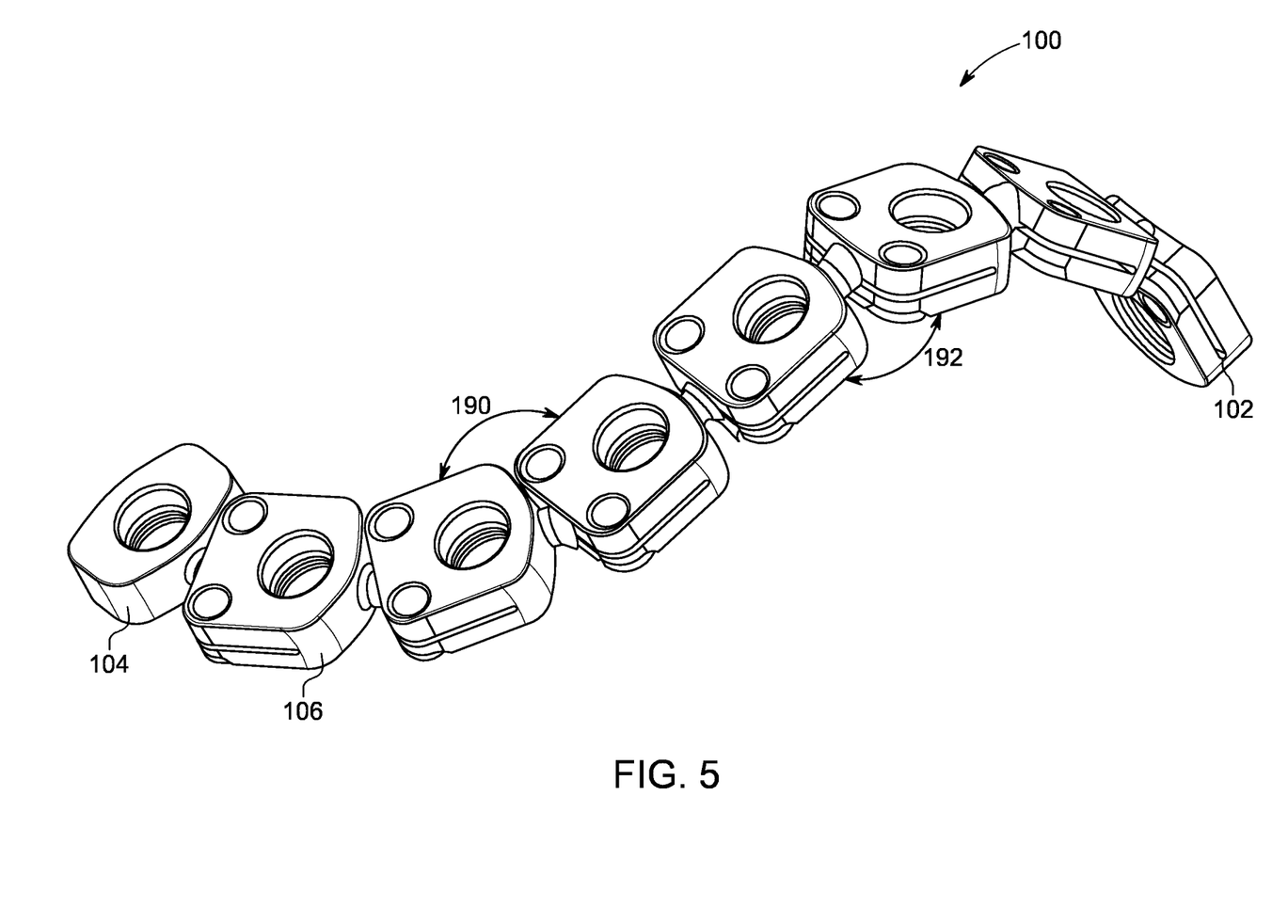
FIG. 5 illustrates a first assembled view of the self-contouring plate with anti-rotation stop.
Figure 6:
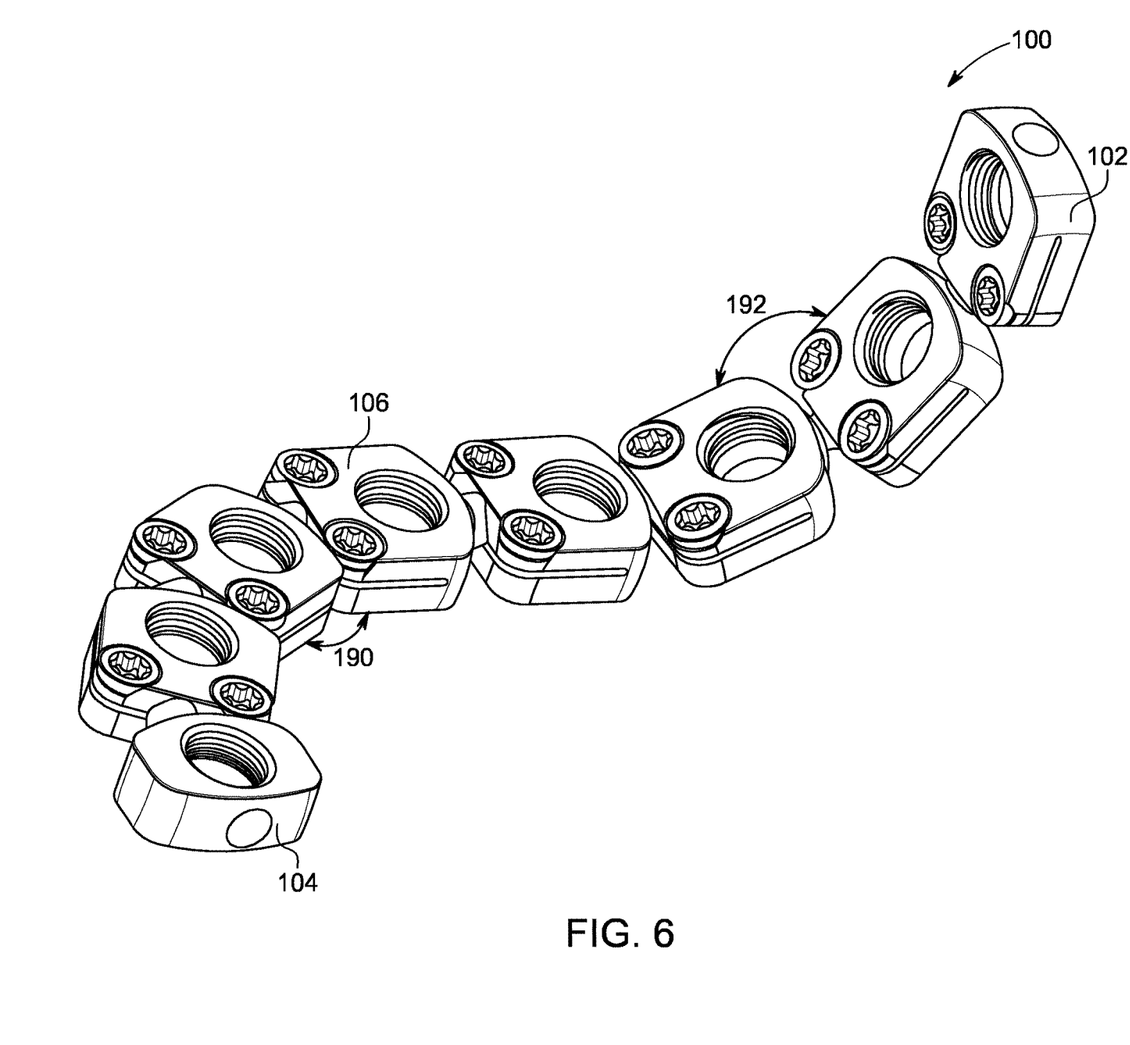
FIG. 6 illustrates a second assembled view of the self-contouring plate with anti-rotation stop.

Referring to FIGS. 5 and 6, a first assembled view and a second assembled view of the self-contouring plate with anti-rotation stop are shown.

A typical self-contouring plate system with rotation stop 100 is assembled from a single headplate 102, multiple central plates 106, and a single tail plate 104.

In a parallel plane, each rigid element of the preferred embodiment of the self-contouring plate system with rotation stop 100 is able to rotate up to 30 degrees, shown as 190. Thus, three elements in series can create a 90-degree bend. Similarly, in a perpendicular plane, each rigid element of the self-contouring plate system with rotation stop 100 is able to rotate up to 30 degrees, shown as 192. Thus, three elements in series can create a 90-degree bend.

In alternative embodiments of the self-contouring plate system with rotation stop 100, the interaction of the projection 118 and projection cavity 122 (see FIG. 8) is altered to stop rotation at angles of between 20 and 45 degrees. For example, the rotation stops at 35 degrees. This allows the device to be tailored to particular uses where the preferred angle of rotation stop between rigid elements differs from 30 degrees.

Figure 7:
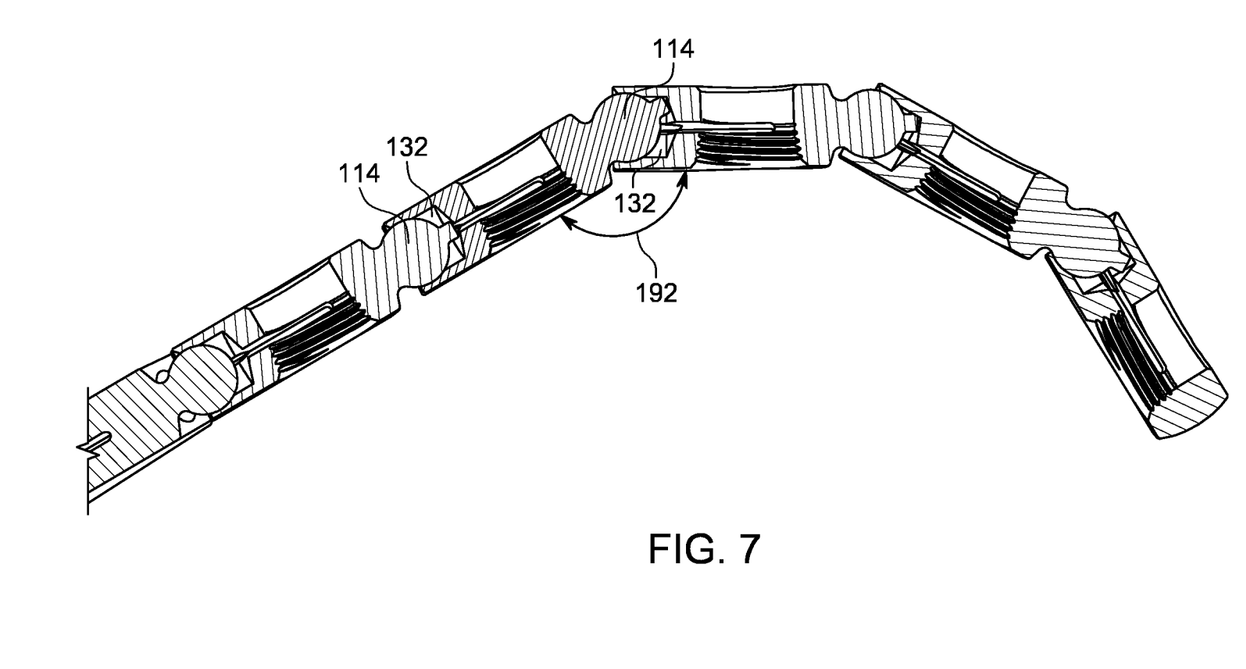
FIG. 7 illustrates a cross-sectional view of an assembly of the self-contouring plate with anti-rotation stop.
Figure 8:
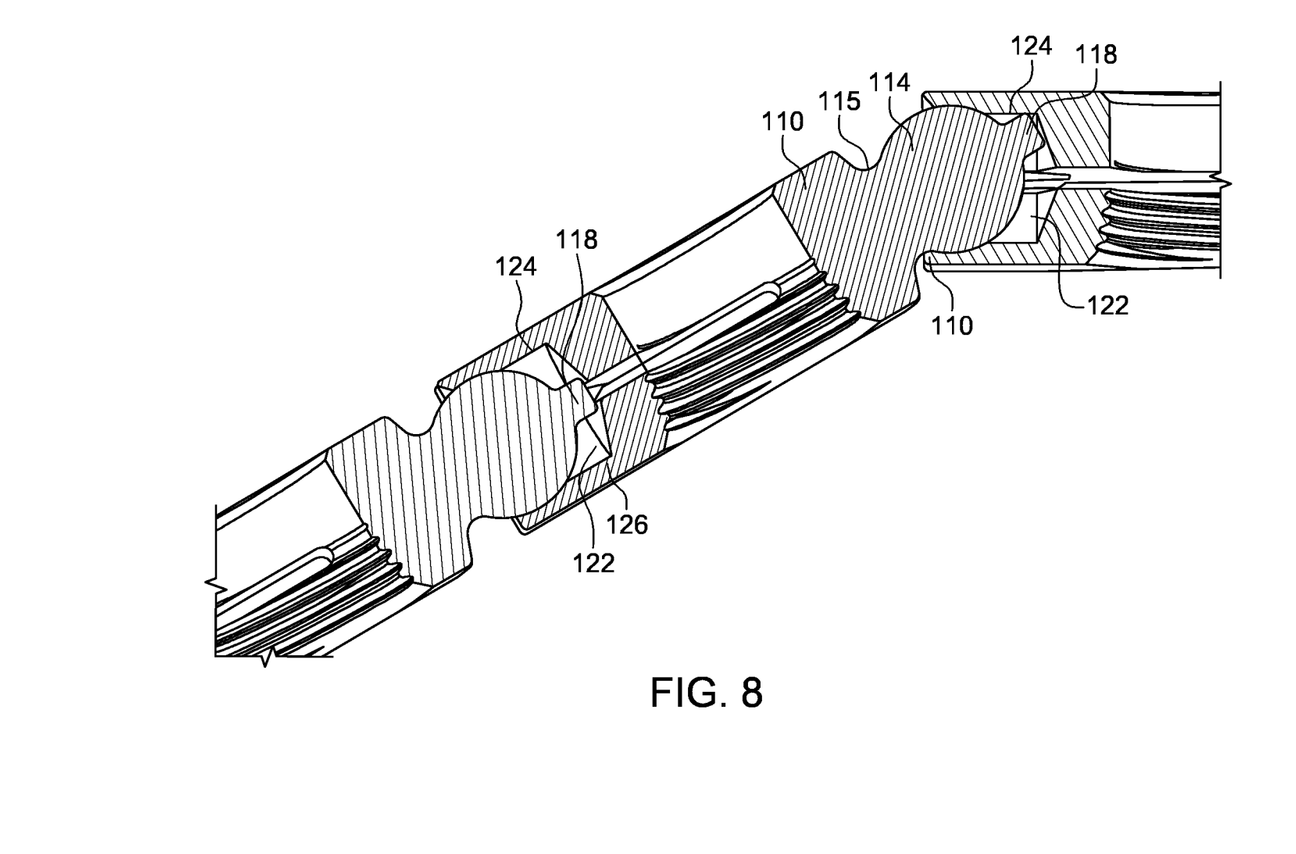
FIG. 8 illustrates a detailed cross-sectional view of an assembly of the self-contouring plate with anti-rotation stop.

Referring to FIGS. 7 and 8, a cross-sectional view and a detailed cross-sectional view of an assembly of the self-contouring plate with anti-rotation stop is shown.

Each had 114 rotates inside a socket 132 of the subsequent rigid element. The projection 118 associated with each head 114 acts as a limit-stop by contacting either the upper rotation limit 124 or the lower rotation limit 126 present within the projection cavity 122. This prevents over-rotation, which by virtue of contact between the neck 115 and the body 110, could cause the head 114 to pop out of the socket 132. The maximum rotation angle in the perpendicular plane is shown as 3o degrees, or angle 192. Adjustments to placement of the upper rotation limit 124 and the lower rotation limit 126 can increase or decrease the maximum rotation limit, or angle 192. For example, to any angle between 20 and 45 degrees.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device setting a position of fractured bones with respect to each other, the device comprising:
    a first plate and a second plate;
        the first plate including a socket and a projection cavity;
        the second plate including a ball and a projection;
            the ball fitting within the socket, allowing movement of the first plate with respect to the second plate;
            the projection placed within the projection cavity;
                walls of the projection cavity limiting movement of the projection, therefore limiting rotation of the ball with respect to the socket;
    a compression slot;
        the compression slot splitting the socket and the projection cavity;
        wherein as a size of the compression slot decreases, compression of the socket against the ball increases;
    whereby the projection contacts the walls of the projection cavity to prevent over-rotation of the first plate with respect to the second plate.

2. The device setting the position of fractured bones with respect to each other of claim 1, wherein:
    the projection contacts the walls of the projection cavity when the first plate is at an angle of 30 degrees with respect to the second plate.

3. The device setting the position of fractured bones with respect to each other of claim 1, further comprising:
    a first compression screw;
    a second compression screw;
        the first compression screw and the second compression screw located on opposite sides of the socket;
    wherein a combination of the first compression screw and the second compression screw determines whether the socket is in a compressed position or an uncompressed position.

4. The device setting the position of fractured bones with respect to each other of claim 1, wherein:
    the socket has a compressed position and an uncompressed position;
    the ball able to rotate within the socket when the socket is in the uncompressed position;
    the ball unable to rotate within the socket when the socket is in the compressed position.

5. The device setting the position of fractured bones with respect to each other of claim 1, further comprising:
    a body hole;
        the body hole split by the compression slot, dividing the body hole into a threaded section and an unthreaded section;
    whereby a bone screw can pass through the body hole, threading only into the threaded section.

6. The device setting the position of fractured bones with respect to each other of claim 1, wherein:
    a lower surface of the first plate and the second plate is curved to match a surface profile of a curved bone.

7. A bone fracture bridging device comprising:
    a head plate connected to a central plate, the central plate connected to a tail plate, each connected at a ball and socket joint;
        the ball and socket joint formed from:
            a head with a projection;
            a socket with a projection cavity;
                walls along a perimeter of the projection cavity;
            the head placed within the socket, the projection placed within the projection cavity;
                rotation of the head within the socket limited by contact between the projection and the walls of the projection cavity;
        the socket has a compressed position and an uncompressed position;
        the head able to rotate within the socket when the socket is in the uncompressed position;
        the head unable to rotate within the socket when the socket is in the compressed position.

8. The bone fracture bridging device of claim 7, further comprising:
    a compression slot;
        the compression slot splitting the socket and the projection cavity;
        as a size of the compression slot decreases, compression of the socket against the head increases.

9. The bone fracture bridging device of claim 8, further comprising:
    a body hole;
        the body hole split by the compression slot, dividing the body hole into a threaded section and an unthreaded section;
    whereby a bone screw can pass through the body hole, threading only into the threaded section.

10. The bone fracture bridging device of claim 7, wherein:
    the projection contacts the walls of the projection cavity when the central plate is at an angle of 30 degrees with respect to the tail plate.

11. The bone fracture bridging device of claim 7, further comprising:
    a first compression screw;
    a second compression screw;
        the first compression screw and the second compression screw located on opposite sides of the socket;
    wherein a combination of the first compression screw and the second compression screw determines whether the socket is in a compressed position or an uncompressed position.

12. The bone fracture bridging device of claim 7, wherein:
    a lower surface of the head plate is curved to match a surface profile of a curved bone.

13. A bone fracture bridging device comprising:
    a plurality of plates, each plate comprising a first end and a second end, the plurality of plates configured to be positioned across a bone fracture;
    a plurality of ball and socket joints, each joint comprising a ball element and a socket element;
        wherein the ball element is attached to the first end of a first plate of the plurality of plates and the socket element is attached to the second end of a second plate of the plurality of plates, allowing for articulation and rotational movement between adjacent plates;
    a projection extending from the ball element into a secondary cavity adjacent to the socket element, limiting the rotational movement of each ball and socket joint;
    a pair of screws located across each ball and socket joint, adjustment of the screws changing compression of the socket element around the ball element; and
    fasteners that pass through the plurality of plates to secure the plurality of plates to a bone, thereby stabilizing the bone fracture.

14. The bone fracture bridging device of claim 13, further comprising:
- a compression slot associated with each ball and socket joint of the plurality of ball and socket joints;
    - the compression slot splitting the socket element and the secondary cavity;
    - as a size of the compression slot decreases, compression of the socket element against the ball element increases.

15. The bone fracture bridging device of claim 14, further comprising:
- a body hole;
    - the body hole split by the compression slot, dividing the body hole into a threaded section and an unthreaded section;
- whereby a bone screw can pass through the body hole, threading only into the threaded section.

16. The bone fracture bridging device of claim 13, wherein:
- the projection contacts an inside of the secondary cavity when any two adjacent plates of the plurality of plates are at an angle of 30 degrees with respect to each other.

17. The bone fracture bridging device of claim 13, further comprising:
- a first compression screw;
- a second compression screw;
    - the first compression screw and the second compression screw located on opposite sides of the socket element;
- wherein a combination of the first compression screw and the second compression screw determines whether the socket element is in a compressed position or an uncompressed position.

18. The bone fracture bridging device of claim 13, wherein:
- a lower surface of the first plate and the second plate is curved to match a surface profile of a curved bone.

* * * * *